June 11, 1940.                M. M. HURD                2,204,414
                        CONTAINER FOR FILM ROLLS
                          Filed Jan. 23, 1939
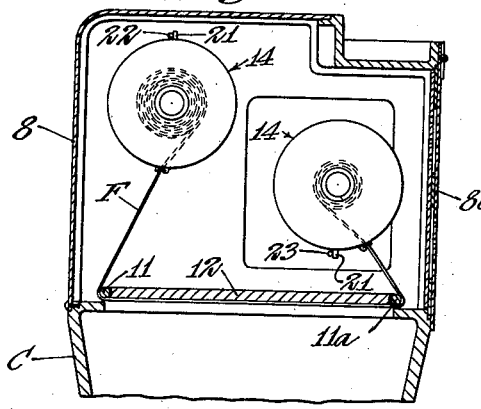
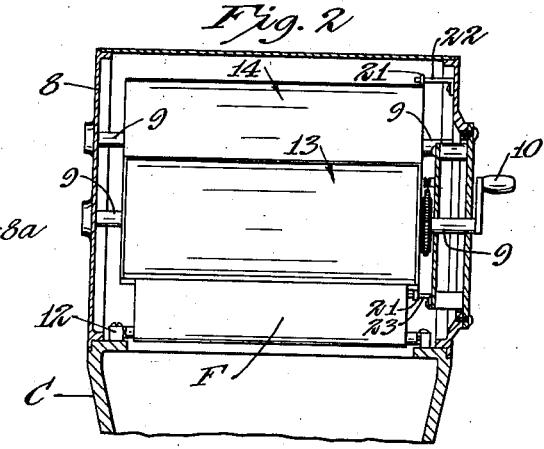
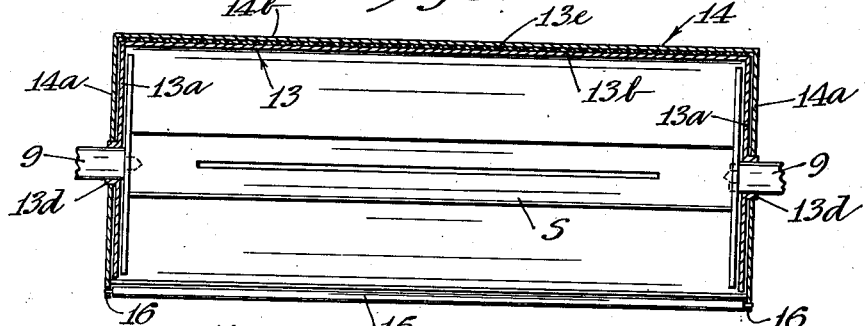
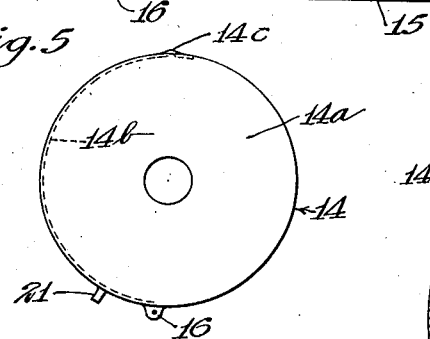
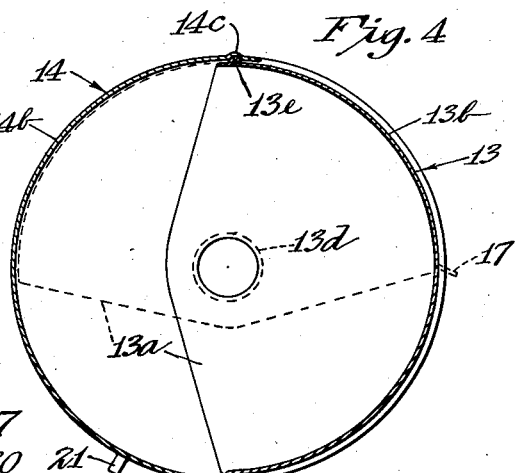
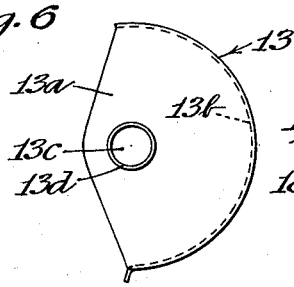
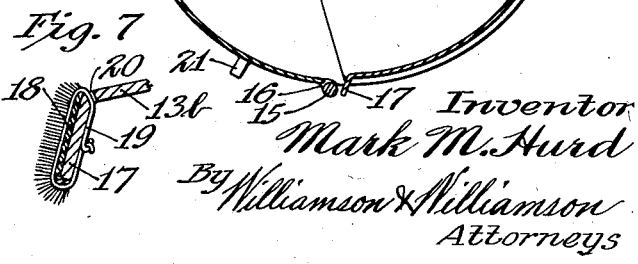
Inventor
Mark M. Hurd
By Williamson & Williamson
Attorneys Patented June 11, 1940

2,204,414

UNITED STATES PATENT OFFICE 2,204,414

CONTAINER FOR FILM ROLLS

Mark M. Hurd, Minneapolis, Minn.

Application January 23, 1939, Serial No. 252,384

3 Claims. (Cl. 242—71)

My invention relates to photographic apparatus and particularly to light-proof holders for photographic film rolls.

In some classes of photographic work film of exceedingly high sensitivity is used. When the nature of the work requires that film rolls be taken out of a camera or placed therein without access to a dark room or at least a place where the light intensity is low, such high sensitivity film is often spoiled by light which enters between the rolled film and the end flanges of the spool on which the film is carried.

In aerial photography such as aerial mapping, several rolls of film are ordinarily used during a run and, preferably, high sensitivity film is employed. Usually a supply of unexposed film rolls is kept in a substantially light-proof cannister until they are placed in the magazine of the camera and exposed rolls are put in a similar cannister immediately after removal from the camera. Each time it is necessary to change film rolls, considerable time is expended in manipulating the cannisters and applying the precautions incidental to changing rolls of high sensitivity film. Since flying time is very expensive, the time expended in changing film in the ordinary manner involves a substantial amount of expense.

An object of my invention is to provide a substantially light-proof cover for a film carrying spool of such nature that the combination of the film carrying spool and the cover may be handled as a unit and be either inserted in or removed from a camera in the same manner as a film carrying spool alone.

Another object of the invention is to provide such a film spool cover adapted for containing a standard film spool and which may be used in a camera without necessitating any alteration in the spool carrying elements of the camera.

Another object is to provide such a device of such construction that film rolls may be quickly and easily placed within or removed from the film roll cover.

Another object is to provide such a film roll cover constructed in such manner that film may be fed from or wound upon a spool contained within the cover and may extend from the spool to a point externally of the cover.

A further object is to provide such a device of light, simple, compact, rugged and inexpensive construction.

These and other objects and advantages of the invention will more fully appear from the following description made in connection with the accompanying drawing, wherein like reference characters refer to the same parts throughout the views, and in which—

Fig. 1 is a vertical sectional view of an aerial camera having embodiments of my invention contained therein in operative relation therewith;

Fig. 2 is a vertical sectional view taken on a plane at right-angles to the plane on which the view of Fig. 1 is taken;

Fig. 3 is a longitudinal sectional view of an embodiment of my invention associated with a film spool and the spool carrying elements of a camera;

Fig. 4 is a cross sectional view of the film spool cover of the preceding figures;

Fig. 5 is an end view of one of the parts shown in Fig. 4;

Fig. 6 is an end view of another of the parts shown in Fig. 4, and

Fig. 7 is a sectional view of a detail which may be included in the device if desired.

Referring to the drawing and particularly to Figs. 1 and 2, a portion of a conventional form of aerial camera C is shown. The camera C includes a film roll containing box 8 wherein two film spools are ordinarily contained, one spool being for unexposed film and the other spool being for film which has been exposed. The film rolls are carried on pivot elements 9, of which one of the pair thereof associated with each spool is retractable for purposes of removal and installation of film spools. One of the pivots 9 for supporting the film spool on which exposed film is wound is connected to a crank 10 by means of which the film is shifted in the usual manner to bring new sections of film into position for exposure. A film strip F placed in the camera in the usual manner extends over a roller 11, then along the surface of a backing plate 12, and then over a second roller 11a. The portion of the film disposed between the rollers 11 and 11a is then in position for exposure. The film containing box 8 is provided with a door 8a which is normally closed and which may be opened to afford access to the film roll within the box 8 for purposes of changing film.

The above described camera structure is of conventional construction and description of a device constituting an embodiment of my invention will follow.

My film roll shield in its preferred form consists of an outer shield element 14 and an inner shield element 13 which when positioned relative to each other in one relation forms a cylindrical casing within which a film spool such as the spool S may be relatively closely contained. The outer shield element 14 includes end portions 14a consisting of centrally apertured discs. The peripheral portion 14b of the outer shield element 14 is formed of sheet material and extends through an angle somewhat greater than 180 degrees. The peripheral portion 14b is secured to the end discs 14a along a seam formed therebetween.

The inner shield element 13 includes end portions 13a which, as shown in Fig. 6, are of sector shape extending through an angle somewhat greater than 180 degrees. The end pieces 13a are provided with an aperture 13c therethrough situated at a point constituting the center of a circle following the edge of the end piece 13a. Each of the end pieces 13a is provided with a collar 13d encircling the aperture 13c in co-axial relation therewith and projecting outwardly of the end piece 13a.

The peripheral portion 13b of the inner shield element 13 may be formed of sheet material and extends through the same angle as the angle containing the sector shaped end pieces 13a. The end edges of the peripheral portion 13b are secured to the peripheral edges of the end pieces 13a in sealed relation therewith.

The inner and outer shield elements 13 and 14 are assembled in such manner that the collars 13d of the inner element are journaled in the centrally apertured portions of the end pieces 14a of the outer shield element 14. It should be apparent then that the respective shield elements 13 and 14 are rotatable relative to each other. The internal diameters of the collars 13d are such that the spool carrying pivot elements 9 of the camera with which the device is to be used may be journaled in the collars 13d as shown in Fig. 3.

The shield elements 13 and 14 are shown in the assembled relation in the cross sectional view of Fig. 4, the position of the inner element 13 relative to the outer element 14 when the device is closed being shown in full lines, and the position when the device is partially opened being indicated in dotted lines. At the upper portion of the outer element 14, as shown in Fig. 4, a longitudinally extending corrugation 14c is formed in the element 14. A light-sealing strip of material 13e is placed in the concave recess of the corrugation 14c to bear against the peripheral portion 13b of the inner shield element 13. The sealing strip 13e may be formed of any suitable compressible material. At the lowermost edge portion of the outer shield element 14, as viewed in Fig. 4, a film guiding roller 15 extending longitudinally of the device and situated closely adjacent the lower free edge of the peripheral portion 14b is provided. The roller 15 is rotatably mounted and may be constructed with an axially projecting element of reduced diameter at each end thereof journaled in suitable apertured ears 16 provided on the peripheral portion 14b.

The lower edge portion of the inner shield element 13b, as viewed in Fig. 4, is bent outwardly to form a film guiding flange or lip 17 closely adjacent but slightly spaced from the roller 15 so as to form a relatively closely fitting film gate between the roller 15 and the lip 17. When a film carrying spool such as the spool S is placed within my device the non-sensitized free end portion of the film may be positioned so as to extend outwardly of the device through the film gate formed as described above. When the spool S within the device contains exposed film the last trailing portion of the non-sensitized end of the film strip will be in a position extending through the film gate.

If desired, the film guiding lip 17 may be provided with a relatively long bristle pad of material 18 such as plush secured thereto as by means of an adhesive. The end portions of the plush pad 18 may be further secured to the lip 17 as by means of a wire loop 19 encircling the lip 17 and extending through suitable apertures 20 formed in the inner shield element 13 at the junction between the peripheral portion 13b thereof and the lip 17.

For prevention of undesired rotation of my device in a camera the peripheral portion 14b of the outer shield 14 is provided at one end thereof with an outwardly projecting lug or stop element 21. The film box 8 of the camera C may be provided with stop pins such as the stop pins 22 and 23 positioned to be engaged by the lug 21 when my device has been rotated to the desired position thereof.

In use of my device where several rolls of film will be used in succession in a camera and removal of exposed rolls and installation of unexposed rolls must be effected without access to a dark room or the equivalent, a number of rolls of unexposed film may be placed in a corresponding number of my devices at an earlier time in a dark room or any place where the light intensity is sufficiently low to prevent damage to high sensitivity film. The devices are, of course, closed immediately after the film rolls are inserted therein. In changing film rolls one of my devices containing an unexposed film and having the non-sensitized free end of the film extending outwardly through the film gate is installed in the camera in the position usually occupied by an unexposed film roll and in the manner in which a film roll without my device is installed. The non-sensitized end of the film is fed past the roller 11, the backing plate 12 and the second roller 11a. One of my devices containing an empty film spool is placed in the position ordinarily occupied by the film spool which receives the film strip after the exposure thereof. The one of my devices containing the empty spool may be opened while it is in its normal position within the camera so that the free end of the film may be inserted in the slot of the empty spool. The device is then closed and the door 13 of the film box of the camera is closed whereafter the camera may be operated in the customary manner until all of the film roll has been exposed and wound upon the previously empty film spool. In changing film the one of my devices containing the exposed film is removed from the camera without opening the device and a second unexposed roll of film and a second empty spool each contained in a respective one of my devices is then installed in the camera as previously described. It should be apparent that all unexposed film and all exposed film is contained within respective ones of my devices during times when a film is being transported, is being installed in the camera, or is being removed from the camera. The ones of my devices containing exposed film may be opened for removal of film after the user has obtained access to a dark room or the equivalent.

My film spool shield not only enables rapid and convenient changing of high sensitivity film rolls in full daylight without damage to the film, but also affords protection against damage to more than a small amount of film if the door to the film magazine is inadvertently opened while unexposed film or exposed film is in the magazine.

It is apparent that I have invented a novel, simple, and effective film spool shield for containing highly sensitive film and so constructed as to permit installation and removal of film spools in a camera while the film spools are contained within my film shields, and that film rolls protected by my shields may be used in a standard camera without the necessity for modification of the film roll carrying elements of the camera.

It will, of course, be understood that various changes may be made in the form, details, arrangement and proportions of the various parts without departing from the scope of my invention.

What is claimed is:

1. A substantially light-proof container for a conventional photographic film spool having the usual apertures in the ends thereof for receiving the spool-carrying spindles of a camera comprising, a pair of partial cylindrical shells associated in overlapping and telescopically rotative relation with each other to form, when in one rotated relative position a cylindrical container for closely containing a film spool, said shells being rotatable relative to each other to a position affording a gap therebetween through which a film spool may be placed in or removed from said container, end walls on respective ends of each of said shells, and a pair of bosses formed centrally on the respective end walls of one of said shells and projecting toward the corresponding end walls of the other of said shells, said corresponding walls having apertures therein wherein said bosses are journalled and said bossed walls and bosses being centrally apertured to afford access of the spool carrying spindles of a camera to the spindle receiving apertures of a spool contained within said container.

2. A substantially light-proof container for a conventional photographic film spool having the usual apertures in the ends thereof for receiving the spool-carrying spindles of a camera comprising, a pair of partial cylindrical casing elements placed one within the other in overlapping relation to form a cylindrical container for closely containing a film spool, end walls on respective ends of each of said shells, and a pair of bosses centrally formed on the respective end walls of one of said elements to project toward corresponding end walls of the other element, said corresponding walls having central apertures wherein said bosses are journalled to enable rotation of one of said elements relative to the other between positions whereat the interior space of said container respectively is substantially entirely enclosed by said elements and is accessible through a gap between said elements whereby a spool may be placed in or removed from said container, and said bossed walls and bosses being apertured for access of the spool-carrying spindles of a camera to the spindle-receiving apertures of a spool within said container.

3. A substantially light proof container for a conventional photographic film spool having the usual apertures in the ends thereof for receiving the spool-carrying spindles of a camera comprising, a pair of partial cylindrical shells each having respective end walls, said shells being associated in overlapping and telescopically rotative relation with each other to form, when in one rotated relative position, a cylindrical container for closely containing a film spool, said shells being rotatable relative to each other to a position affording a gap therebetween through which a film spool may be placed within or removed from said container, and means at each end of said container for rotatably interconnecting the central portions of corresponding end walls of said respective shells, said means both being centrally apertured to afford access of the spool-carrying spindles of a camera to the spindle-receiving apertures of a spool contained within said container.

MARK M. HURD.